United States Patent Office 3,701,803
Patented Oct. 31, 1972

3,701,803
METHOD FOR THE PRODUCTION OF ACETOACETIC ACIDS
Karl-Josef Boosen, Visp, Switzerland, assignor to Lonza Ltd., Basel, Switzerland
No Drawing. Filed July 2, 1969, Ser. No. 838,646
Claims priority, application Switzerland, July 4, 1968, 10,035/68
Int. Cl. C07c 59/32, 59/36
U.S. Cl. 260—526 R
9 Claims

ABSTRACT OF THE DISCLOSURE

The hitherto-undescribed crystalline acetoacetic acid and halogeno-acetoacetic acids of the formula $$R_1CH_2\text{---}CO\text{---}CR_2R_3\text{---}COOH$$

in which $R_1$, $R_2$ and $R_3$ each represent hydrogen or $R_1$ represents halogen (preferably chlorine or bromine) and $R_2$ and $R_3$ each represents hydrogen or halogen (preferably chlorine or bromine) are obtained by converting diketene into an acetoacetic acid halide or halogenoacetoacetic acid halide by means of hydrogen halide or halogen at a temperature of from about $-10$ to $-40°$ C., and the acetoacetic acid halide or halogenoacetoacetic acid halide is converted into the corresponding acid by hydrolysis with a stoichiometrically equivalent quantity of water.

BACKGROUND OF THE INVENTION

Field of the invention

This invention relates to a process for the production of acetoacetic acids of the general formula $$R_1CH_2\text{---}CO\text{---}CR_2R_3\text{---}COOH$$

in which $R_1$, $R_2$ and $R_3$ each represents hydrogen or $R_1$ represents halogen and $R_2$ and $R_3$ each represents hydrogen or halogen.

Prior art

It is known that acetoacetic acid can be prepared by carefully hydrolysing acetoacetic esters with dilute aqueous potassium hydroxide solution at room temperature. In this reaction, the acid formed has to be separated off from any unreacted ester by conversion into its barium salt, and the free acid has to be liberated again from this salt. The free acetoacetic acid obtained in this way is described in the literature as a viscous liquid which cannot be further purified on account of its tendency to decompose into acetone and carbon dioxide. It is also known that γ-chloro-acetoacetic acid can be prepared by the acid hydrolysis of γ-chloro-acetoacetic ester. The hydrolysis reaction, which is carried out over a period of 45 hours at room temperature with 2 N hydrochloric acid, gives a yield of 46%. There is no evidence of the preparation of any other acetoacetic acids in free form.

DESCRIPTION OF THE INVENTION

The object of the present invention is to prepare highly pure free acetoacetic acid and free halogen-aceto-acetic acids in high yields.

According to the invention, this object is achieved in a process for the production of acetoacetic acids of the general formula $$R_1CH_2\text{---}CO\text{---}CR_2R_3\text{---}COOH$$

in which $R_1$, $R_2$ and $R_3$ each represents hydrogen or $R_1$ represents halogen and $R_2$ and $R_3$ each represents hydrogen or halogen, wherein diketene is converted into the corresponding acetoacetic acid halide at a temperature of from $-10$ to $-40°$ C., and the halide thus obtained is hydrolysed with a stoichiometrically-equivalent quantity of water at temperature of from $-10$ to $-40°$ C.

To prepare free acetoacetic acid itself diketene is converted into an acetoacetic acid halide by means of an anhydrous hydrogen halide at a temperature of preferably from $-20$ to $-30°$ C., and the acetoacetic acid halide thus obtained is immediately hydrolysed with a stoichiometrically equivalent quantity of water.

To prepare the halogenoacetoacetic acids, diketene is converted into a corresponding halogenoacetoacetic halide by means of an anhydrous halogen at a temperature of preferably from $-20$ to $-30°$ C., and the halogenoacetoacetic acid halide thus obtained is subsequently hydrolysed with a stoichiometrically equivalent quantity of water at a low temperature, γ-halogeno-acetoacetic acid; α,γ-dihalogeno-acetoacetic acid or α,α,γ-trihalogeno-acetoacetic acids are thus formed, depending upon the quantity of halogen used. Hydrogen chloride and hydrogen bromide are the preferred hydrogen halides, whilst chlorine and bromine are particularly suitable halogens.

The reaction is preferably carried out in the presence of a low boiling solvent which is inert both to diketene itself and to halogens and hydrogen halides.

Examples of solvents such as these include such halogenated hydrocarbons as chloroform, dichloroethane, carbon tetrachloride, dichloropropane and liquid sulphur dioxide. Carbon tetrachloride is preferably used. This has the advantage that the acetoacetic acids are substantially insoluble in cold carbon tetrachloride, so that they can be readily separated off.

The acids are soluble without decomposing in boiling carbon tetrachloride, and crystallise out again substantially quantitatively on cooling.

It has surprisingly been found that, contrary to what is reported in the literature, free acetoacetic acid is not a viscous liquid but a colourless crystalline substance with a melting point of from 31 to 33° C. The halogen derivatives of acetoacetic acid are also colourless crystalline substances. The individual acetoacetic acids that can be obtained by the process according to the invention vary in their stability. Thus, free acetoacetic acid itself remains stable for several weeks when stored in the dark at temperatures below 0° C. in the absence of air and moisture. Heating above the melting point is accompanied by spontaneous decarboxylation. γ-chloro- and γ-bromoacetoacetic acid are both stable for several weeks when stored at room temperature.

The stability of α,γ-dichloro-acetoacetic acid and α,α,γ-trichloro-acetoacetic acid is similar to that of acetoacetic acid. They are also best stored in the dark at temperatures below room temperature.

The invention is further illustrated by the following non-limiting examples.

EXAMPLE 1.—Acetoacetic acid 84 g. of diketene were dissolved in 500 ml. of carbon tetrachloride and 37 g. of gaseous dry hydrogen chloride were introduced into the resulting solution at $-20°$ C. 18 g. of water were immediately added dropwise to the acetoacetyl chloride formed, which did not have to be isolated, the temperature being kept in the range from $-20$ to $-30°$ C. The reaction was completed by stirring for 1 hour at $-20$ to $-30°$ C. The crystals that precipitated were suction-filtered, washed with cold carbon tetrachloride and dried in vacuo at room temperature. Acetoacetic acid, M.P. 31–33° C. was obtained in a yield of 93.3 g. of 91.5% of the theoretical quantity. It was identified by elementary analysis and infra-red spectroanalysis. The ratio of C:H:O was 7.82:1.00:7.95. For comparison, the calculated ratio of C:H:O is 8.00:1.00:8.00.

EXAMPLE 2.—γ-Chloro-acetoacetic acid 84 g. of diketene were dissolved in 500 ml. of carbon tetrachloride and 71 g. of chlorine gas were introduced into the resulting solution at −25° C. The γ-chloro-acetoacetyl chloride formed was immediately hydrolysed, i.e. without being isolated, with 18 g. of water at −20 to −30° C., and the resulting product was stirred for another hour. The crystallised γ-chloro-acetoacetic acid was suction-filtered, washed with cold carbon tetrachloride and dried at 20° C./20 torr. γ-chloro-acetoacetic acid M.P. 66.5–67.2 C. was obtained in a yield of 104.8 g. or 76.8% of the theoretical quantity. It was identified as described in Example 1.

Calculated (percent): C, 35.16; H, 3.66; O, 35.16; Cl, 26.02. Found (percent): C, 35.3; H, 3.7; O, 35.1; Cl, 26.1.

EXAMPLE 3.—γ-Bromo-acetoacetic acid 84 g. of diketene were dissolved in 500 ml. of carbon tetrachloride and 160 g. of bromine dissolved in 200 ml. of carbon tetrachloride were added dropwise to the resulting solution at −20° C. Hydrolysis was carried out with 18 g. of water as described in Example 1. The crystallised γ-bromo-acetoacetic acid was suction-filtered, washed and dried in vacuo. γ-Bromo-acetoacetic acid, M.P. 69–69.5° C., was obtained in a yield of 166.8 g. or 92.1% of the theoretical quantity. It was again identified by elementary analysis and infrared spectroanalysis.

Calculated (percent): C, 26.52; H, 2.76; O 26.52; Br, 44.2. Found (percent): C, 26.5; H, 3.0; O, 27.2; Br, 44.8.

EXAMPLE 4.—α,γ-Dichloro-acetoacetic acid

The procedure was as described in Example 2, except that 142 g. instead of 71 g. of chlorine were introduced. α,γ - dichloro - acetoacetic acid, M.P. 53–54° C., was obtained in a yield of 133.5 g. or 78.0% of the theoretical quantity. It was again identified by infra-red spectroanalysis and elementary analysis.

Calculated (percent): C, 28.07; H, 2.34; O, 28.07; Cl, 41.52. Found (percent): C, 27.8; H, 2.2; O, 27.7; Cl, 40.4.

What is claimed is:

1. A method of producing acetoacetic acid wherein diketene is reacted with a hydrogen halide selected from hydrogen chloride and hydrogen bromide at a temperature of from about −40 to about −10° C. to give an acetoacetic acid halide of the formula

wherein Hal represents a halogen atom selected from chlorine and bromine, and said acetoacetic acid halide is hydrolysed by means of a stoichiometrically equivalent quantity of water at a temperature of from about −10 to about −40° C. to form said acetoacetic acid.

2. A method according to claim 1 wherein said diketene is reacted with said hydrogen halide and said acetoacetic acid halide is hydrolysed in the presence of an inert solvent.

3. A method according to claim 2 wherein said inert solvent is selected from the group consisting of halogenated hydrocarbons.

4. A method according to claim 2 wherein said inert solvent is carbon tetrachloride.

5. A method of producing solid acetoacetic acid wherein diketene is reacted with hydrogen chloride in carbon tetrachloride at a temperature of from about −10 to about −40° C., to form acetoacetyl chloride and said acetoacetyl chloride is hydrolysed with a stoichiometrically equivalent quantity of water at a temperature of from about −10 to about −40° C. and precipitated acetoacetic acid is filtered off from said carbon tetrachloride.

6. A method of producing acetoacetic acid wherein diketene is reacted at a temperature between about −10° to about −40° C. with halogen halide to give an acetoacetic acid halide of the formula

wherein Hal represents a halogen atom, and said acetoacetic acid halide is hydrolysed by means of a stoichiometrically equivalent quantity of water at a temperature of from about −10 to about −40° C. to produce said acetoacetic acid.

7. A method according to claim 6 wherein said diketene is reacted with said halogen or halogen halide and said acetoacetic acid halide is hydrolysed with water in the presence of an inert solvent.

8. A method according to claim 7 wherein said inert solvent is a halogenated hydrocarbon.

9. A method according to claim 8 wherein said inert solvent is carbon tetrachloride.

References Cited

UNITED STATES PATENTS

| | | | |
|---|---|---|---|
| 2,184,963 | 12/1939 | Steik | 260—585.5 |
| 2,209,683 | 7/1940 | Boese | 260—544 Y |
| 2,843,630 | 7/1958 | Lacey et al. | 260—544 Y |
| 2,862,964 | 12/1959 | Lacey | 260—544 Y |

OTHER REFERENCES

Boese: Industrial & Engineering Chem. (1940) p. 17.

Krueger: Jour. Amer. Chem. Soc., vol. 74 (1952), p. 5536.

JAMES A. PATTEN, Primary Examiner

U.S. Cl. X.R.

260—539, 544 Y